Oct. 18, 1966    T. R. REINHART    3,279,085
APPARATUS FOR INSPECTING INTERIORS OF APPARATUSES AND THE LIKE
Filed March 11, 1963    4 Sheets-Sheet 1

INVENTOR:
T. R. REINHART
BY: *Theodore E. Bieber*
HIS ATTORNEY

United States Patent Office 3,279,085
Patented Oct. 18, 1966

3,279,085
APPARATUS FOR INSPECTING INTERIORS OF APPARATUSES AND THE LIKE
Tom R. Reinhart, Houston, Tex., assignor to Shell Oil Company, New York, N.Y., a corporation of Delaware
Filed Mar. 11, 1963, Ser. No. 264,383
2 Claims. (Cl. 33—205.5)

This invention pertains to devices for optically viewing and inspecting the interior of cylindrical objects such as tubes, pipes and boreholes. More particularly, this invention pertains to a means for improving the scanning operation of known optical inspecting devices.

At the present two methods are used to optically inspect or view the interior of cylindrical openings. The first of these methods utilizes axial viewing through a wide angle lens while the second obtains a direct radial view obtained by utilizing an axially mounted viewing or inspecting device in conjunction with a mirror disposed at a 45° angle to the axis of the cylindrical opening. The first system, utilizing a wide angle lens system, views a large area of the cylinder or a borehole wall at one particular time. While this system views a large area, it is optically disadvantageous under low light levels since the lens aperture must be wide open and the resulting short depth of focus degrades the value of the large area being viewed. This degradation is severe in that the short depth of focus seriously limits the portion of the borehole wall or cylinder wall that is within the field of focus. The second method minimizes the disadvantage of small depth focus and offers a detailed view of the borehole or cylinder walls although it adds the disadvantage of being able to scan a very small area at any particular time. Thus considerable time must be expended to inspect the entirety of any borehole or cylinder of any extent with this second method. Furthermore, if the irregularities in the borehole or cylinder wall are prominent, the system also suffers from a lack of depth of focus when the lens aperture is wide open as in low ambient light conditions. Additionally, this second system must be provided with some means for rotating the inclined mirror to permit the scanning of the complete circumference of the cylinder or borehole wall.

Accordingly, it is the principal object of this invention to provide a new scanning system for an optical viewing device that permits the scanning of a large area of a cylinder or borehole wall while maintaining the complete area scanned within the field of focus of the optical viewing device.

A further object of this invention is to provide for a novel scanning system for an optical viewing device that permits the scanning of a large area of a cylinder or borehole wall while maintaining a near equal resolution for features in perpendicular directions on the cylinder or borehole wall.

A further object of this invention is to provide a novel scanning system for an optical viewing device in which a spherical convex mirror is placed on the axis of the optical viewing device with the axis of the optical viewing device being aligned with the axis of the cylinder or borehole to be inspected.

A further object of this invention is to provide a novel scanning system for an optical viewing device that permits the scanning of a large area of a cylinder or borehole wall while auxiliary data or measured information is superimposed on to the viewed scene.

The above objects and advantages of this invention are obtained by arranging a spherical convex mirror on the optical axis of an optical viewing device to provide a scanning device that yields a 360° view of the interior of a tubular opening. The axis of the optical viewing device in turn is aligned with the axis of a tubular opening such as a cylinder or borehole that is to be inspected. The spherical convex mirror is positioned so that it, or a portion of its surface, occupies the entire field of view of the optical viewing device. This scanning device provides a 360° perspective view of the cylinder or borehole although the depth of focus that is required of the optical viewing device is limited to a very small range. The optical viewing device views the image formed by the spherical mirror, and the movement of the image formed by the spherical mirror with varying object distances can easily be made to fall within the depth of focus of known optical systems even when the optical system has a fully open aperture in poor ambient light conditions.

It is known that the use of spherical optical components with non-paraxial rays introduces spherical distortion. In the present scanning device the spherical distortion of non-paraxial rays is utilized to obtain near equal resolution for features in perpendicular directions on the cylinder or borehole wall. The resultant view of the cylinder or borehole wall is a distorted perspective, but the distortion is acceptable to the human senses and may be easily interpreted by personnel with no prior training or instruction.

For the purpose of providing superpositioning of auxiliary data or information onto the viewed scene of the cylinder or borehole walls, small characters or numbers may be etched on the surface of the spherical mirror. Since, the spherical mirror is identical with respect to any angular direction, it may be rotated about any one of three axes without changing its optical qualities. The coordinates of these three axes may be etched into the surface of the mirror without seriously affecting the view of the cylinder or borehole wall, and a reticule in the optical viewing device may be used as an index to measure the angular position of the spherical mirror. The mirror may be angularly positioned by devices responding to measured or natural phenomenon. For example a gimbaled and pivoted spherical mirror, containing within its structure a magnet and pendulous weight to provide a measurement of magnetic azimuth and hole inclination superimposed on the view of cylinder and borehole walls of a generally vertical direction.

The above objects and advantages will be more easily understood when taken in conjunction with the attached drawing showing a preferred embodiment of this invention in which:

FIGURE 1 is a view of one embodiment of this invention adapted to inspect boreholes and the like;

As used in the following description, the term "optical viewing device" is used to describe either direct optical viewing systems or systems using an auxiliary device such as a photographic camera or television camera. For example, in Patent No. 2,632,801 entitled "Deep Well Camera," there is disclosed a system for optically inspecting or viewing well bores and the like. The system disclosed utilizes a rotating mirror inclined at an angle to the axis of the well to view the borehole wall. In the case of a photographic or television camera the term "optical viewing device" refers to the lens system used on the camera and the term "depth of focus" and "aperture" of the optical viewing system refers to the adjustment of this lens system. Of course, in the case of direct viewing the term optical viewing device refers merely to the lens system utilized to afford the viewer a focussed view on the surface being inspected.

Figure 1:
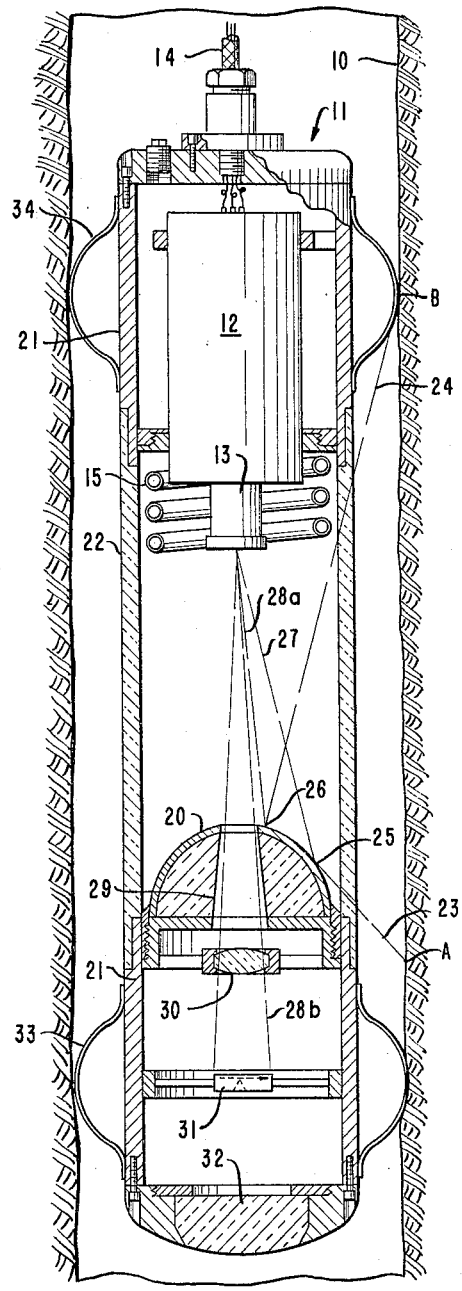

Referring now to FIGURE 1, there is shown a borehole 10 having an optical viewing or inspecting device 11 disposed therein. The optical viewing device is illustrated as being a television camera 12 having a lens system 13. The optical viewing device is supported for movement through the well by a cable 14 that also includes suitable circuits for the operation of the television camera 12. Surrounding the lens system 13 is a light or illuminating means 15. The illuminating means may take various forms, for example a circular neon gas discharge type of lighting device may be used. The sole requirement for the lighting means being that it provide sufficient illumination of the borehole 10 even under adverse conditions. Disposed below the lens system 13 is a convex spherical mirror 20. The spherical mirror 20 is mounted in the housing 21 of the optical scanning device 11 with its axis aligned with the axis of the optical system 13. The axis of the mirror 20 and the optical system 13 are aligned with the borehole axis by the action of centralizers 33 and 34. The housing 21 is provided with a transparent section 22 through which the borehole wall may be viewed by the combination of the spherical mirror 20 and the lens system 13. The housing 21, of course, must normally be made fluid tight and have sufficient strength, or be of a balanced pressure design, to withstand the pressures normally encountered in boreholes or the like.

Also shown in FIGURE 1 are two light rays 23 and 24 that strike the surface of the spherical mirror 20 at points 25 and 26, respectively. Since the light rays obey the law of reflection that equates the angle of incidence to the angle of reflection, the light rays that are reflected from points 25 and 26 will be the light rays 27 and 28. It is to be noticed that the central portion of the spherical mirror 20 which would otherwise reflect a view of the optical viewing device 11 has been removed to form the opening 29. Of course, the opening 29 does not require that an opening be physically formed in the mirror 20 but only that the reflecting coating be removed and a transparent opening formed in the mirror. The cones formed by rotating the rays 27 and 28a about the axis of the optical viewing device 11 define the field of the lens system 13 that is filled by the view of the borehole or cylinder walls. The ray 27 also represents the angle of the maximum field of lens system 13. Thus, it is apparent that the spherical mirror will permit one to view a large circumferential area of the borehole or cylinder wall lying between limits A and B.

Furthermore, the image of an indicating device 31 shown in FIGURE 1 as a magnetic compass may be formed by lens 30 near the hole 29 so as to be in focus with the view of the borehole or cylinder wall formed by the spherical mirror. Alternately, the indicating device 31 may be removed and the housing bottom 32 may be made of a transparent material, and lens 30 may be adjusted to bring into focus a view of the bottom of, or an obstruction in, the borehole 10.

Whereas in the above description, it has been stated that the lens system 13 has a field of view delineated by light ray 27; and the view of the indicating device 21, or the bottom of the borehole 10, occupies a field delineated by light ray 28b. It may be preferable in certain cases to provide for lens system 13 a lens of variable focal length commonly known as a "zoom" lens. With such a lens the focal length of lens system 13 could be varied so as to have in one case the field of view of the lens system 13 encompassing the entirety of the spherical mirror 20, and in the other case the field of view restricted to enclose only the area defined by the hole 29 so that an enlarged and detailed view is possible of the indicating device 31 or the bottom of the borehole 10.

Figure 2:
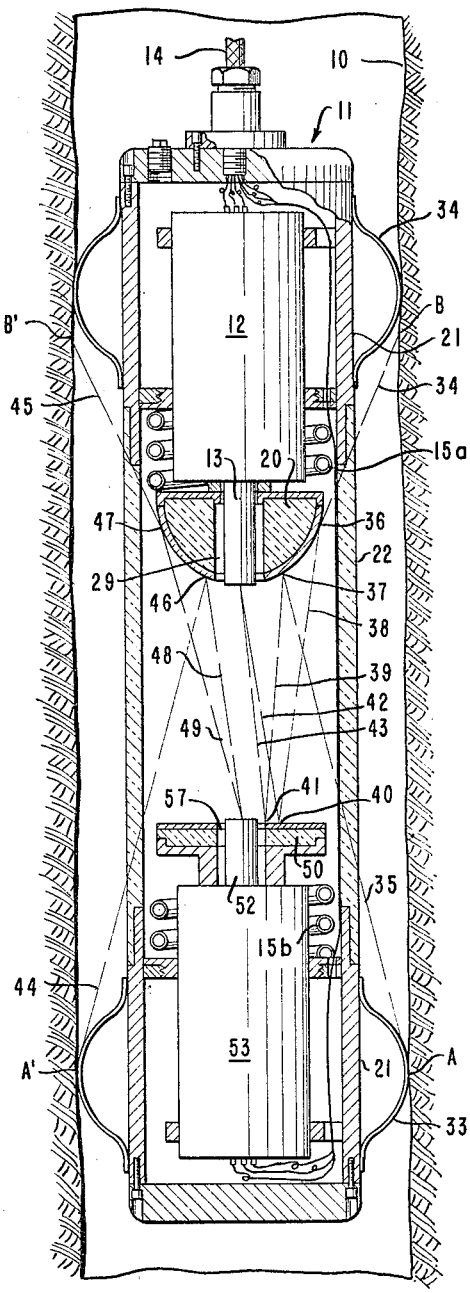
FIGURE 2 is a modification of the embodiment shown in FIGURE 1, and which permits two optical viewing systems to share the same field of view.

Referring now to FIGURE 2, there is shown a separate or modified form of the invention shown in FIGURE 1 which utilizes a second optical viewing system 53. In this embodiment the spherical mirror 20 is mounted around the primary lens system 13 while a plane mirror 50 is mounted in front of the secondary lens system 52. Lights 15a and 15b provide illumination of the borehole or cylinder walls through the transparent section 22 of the housing.

For reasons of clarity those light rays entering the primary lens system 13 are shown on the right half of the figure and those rays entering the secondary lens system 52 are shown on the left of the figure. Referring now to the rays of light entering the primary lens system 13 and illustrated on the right half of FIGURE 2, it is seen that light rays 34 and 35 emanating from points B and A respectively of the borehole wall 10 are reflected at points 36 and 37, respectively, on the spherical mirror into rays 38 and 39 which are again reflected at points 40 and 41 on the plane mirror into the rays 42 and 43 which enter the primary optical system 13. The area of the borehole wall within the field of view of lens system 13 is therefore the circumferential area lying between points A and B of the borehole wall 10. As in the case with the embodiment shown in FIGURE 1, the area of the plane mirror 50 which would otherwise reflect a view of the hole 29 in the spherical mirror back to the lens system 13 is removed leaving the hole 57 in the plane mirror 50.

Referring now to the rays of light entering the secondary lens system 52 and illustrated on the left half of FIGURE 2, it is seen that light rays 44 and 45 emanating from points A' and B' respectively of the borehole wall 10 are reflected at points 46 and 47, respectively, on the spherical mirror 20 into rays 48 and 49 which pass through hole 51 in the plane mirror 50 into the secondary optical system 52. For the secondary optical system 52 to have the same field of view of the borehole in cylinder wall as the primary optical system 13 it is only necessary for the primary optical system 13 to have one half the field of view or twice the focal length of the secondary optical system 52.

The secondary optical system could, of course, be any one of the optical viewing devices that already have been mentioned as possible with the primary viewing device 11. One such possibility to illustrate the value of this embodiment is the use of a "black and white" television camera acting as the primary viewing device 11 and acting as a "view finder" for a remotely actuated color photographic camera as a secondary viewing device 53.

Figure 3:
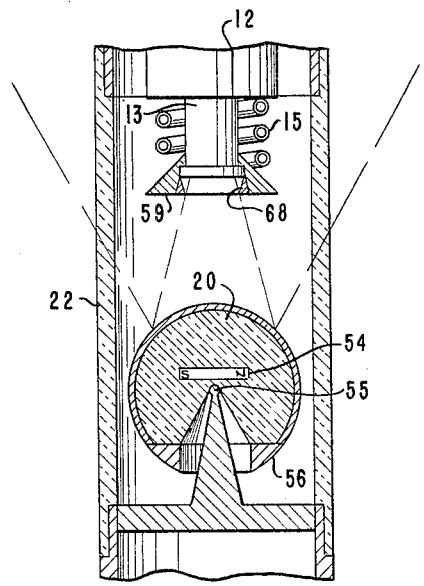
FIGURE 3 is a modification of the embodiment shown in FIGURE 1 which permits the measurement of auxiliary data or information by superpositioning said data or information with the viewed scene of the borehole or cylinder walls.

Referring now to FIGURE 3, there is shown a separate or modified form of the invention shown in FIGURE 1. In this embodiment the spherical mirror 20 is supported by the pivot 55 and does not touch the transparent section of the housing 22. Internal to the spherical mirror is a bar magnet 54, and at the base of the spherical mirror is a ring of heavy material 56. The center of gravity of the assembly of the spherical mirror 20, the bar magnet 54 and the ring of heavy material 56 is appreciably below the pivot point 55 so that the axis of the spherical mirror as defined by the axis of the attached ring of heavy material 56 will remain in a vertical direction so long as the limits of travel are not exceeded. Due to the low friction of the pivot point 55, the bar magnet will align itself with the magnetic field present. Being fixed to the spherical mirror, the bar magnet will also align the mirror with the magnetic field. In other respects the spherical mirror of FIGURE 3 is optically the same as that illustrated in FIGURE 1 with the exception that the central portion of the spherical mirror 20 in FIGURE 3 which reflects a view of the optical viewing device 12 back into the lens system 13 has not been removed in the case of FIGURE 3. Recalling that the axis of the lens system and the optical axis of the spherical mirror coincide, it is clear that the image of the optical viewing device as reflected back into the lens system will always remain centered in the field of view of the lens system 13. Accordingly, on the lowermost edge of the light shield 59, two pair of perpendicular marks 68 may be made to serve as a reticule as further illustrated in FIGURE 4.

Figure 4:
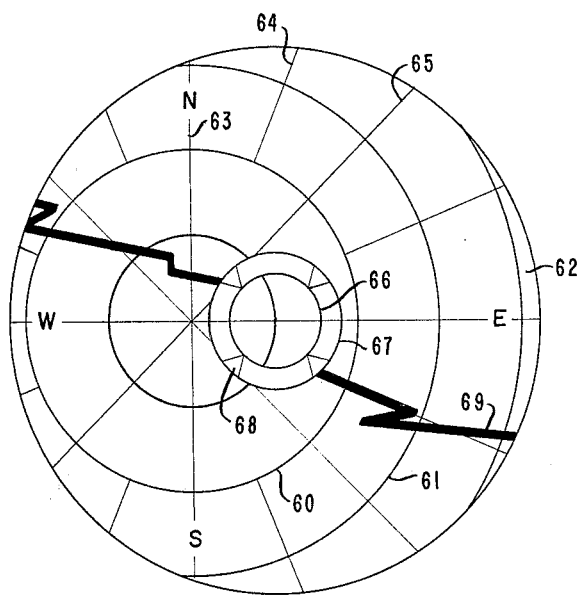
FIGURE 4 is a drawing of the markings on the spherical mirror of one such embodiment of FIGURE 3 intended to measure the direction of the magnetic azimuth and the direction and amount of vertical inclination in vertically oriented cylinders or boreholes.

Referring now to FIGURE 4, there is shown a view as would be seen by the optical viewing device 11 when used with the apparatus of FIGURE 3. Circular lines 60, 61, and 62 are lines of equal inclination from vertical lightly etched on to the surface of the spherical mirror 20. Lines 63, 64 and 65 are lines of equal magnetic azimuth also lightly etched on to the surface of the spherical mirror 20. Circle 66 is the reflection of lens system 13 of FIGURE 3, circle 67 is the reflection of the light shield 59 of FIGURE 3, and marks 68 are marks made on the light shield 59 of FIGURE 3 for the purpose of forming a reticule. By reading the number of the azimuth line and of the inclination circle falling at the intersection of the marks 68, a measurement of the magnitude of the well bore's inclination to the vertical and the direction of said inclination may be made. Additionally the magnetic azimuth of well bore features, shown in FIGURE 4 as a formation fracture 69, may be measured.

It is apparent from the above description that the spherical mirror may be used to obtain measurements of auxiliary data or information superimposed upon a view of cylinder or borehole walls.

Figure 5:
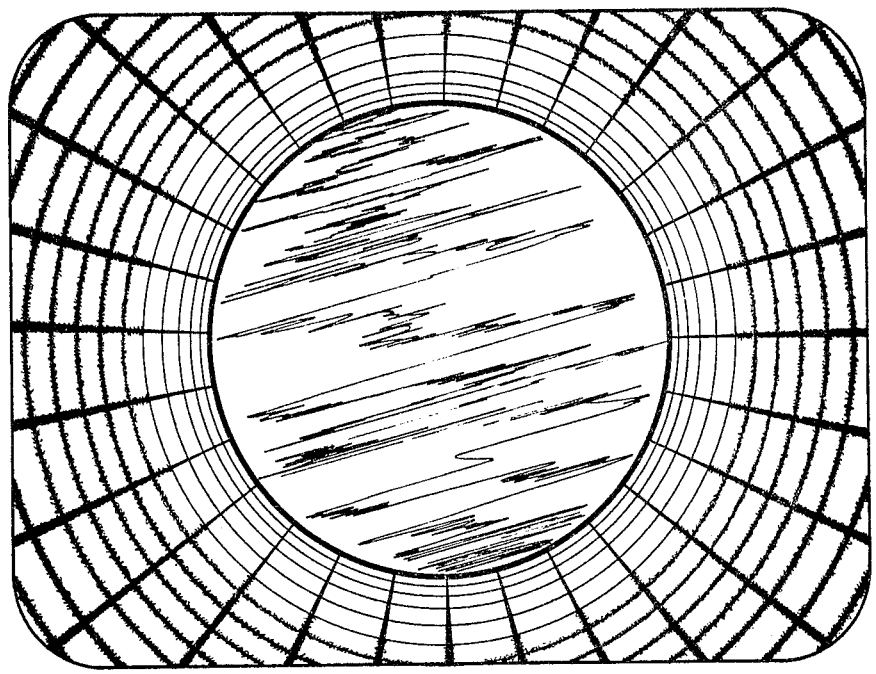

Referring now to FIGURES 5, 6, 7 and 8, the specific advantages of the use of a convex spherical mirror may be pointed out. More particularly, FIGURE 5 illustrates the view obtained when one uses a 30° field of view lens to directly view a one inch square grid pattern formed into a cylindrical surface. Thus, the vertical lines are exactly one inch apart and the horizontal circles have exactly a one inch vertical separation. From an inspection of FIGURE 5 it is seen that the direct view through the 30° field of view lens considerably shortens the vertical dimensions with respect to the horizontal dimensions and virtually all resolution of horizontal features is lost. Furthermore, due to the limited depth of focus of this lens because of wide open aperture, only the extreme or bottom portion of the cylinder wall is in sharp focus.

Figure 6:
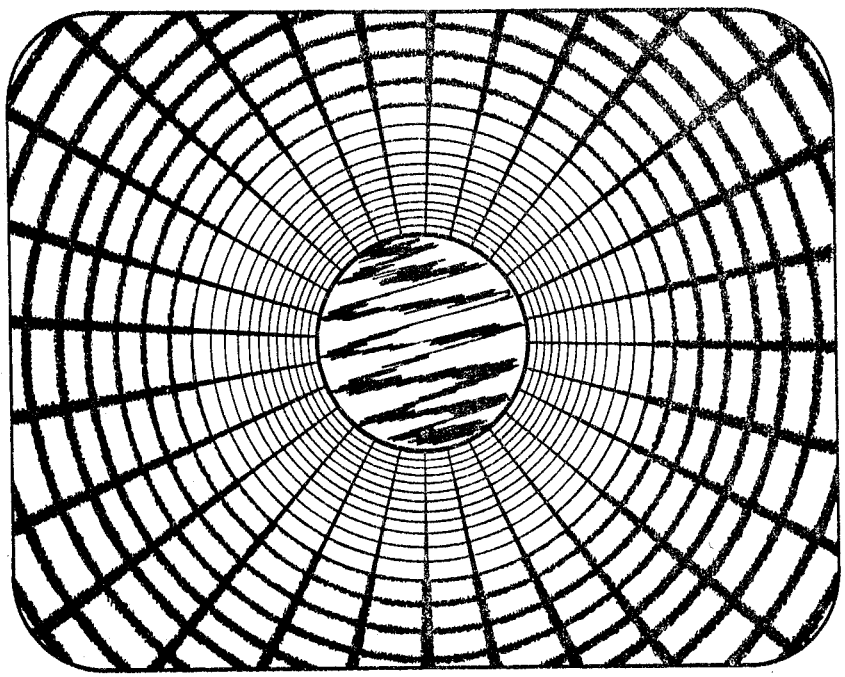
FIGURES 5 to 8 illustrate the view obtained by an optical inspecting system utilizing various means to scan the cylinder or borehole wall.

FIGURE 6 illustrates the view of the same cylindrical surface as that of FIGURE 5 as directly viewed through a 60° field of view lens. Although the view is improved, the vertical dimensions are still considerably shortened, and the only portion of the view that is in sharp focus is the bottom half.

Figure 7:
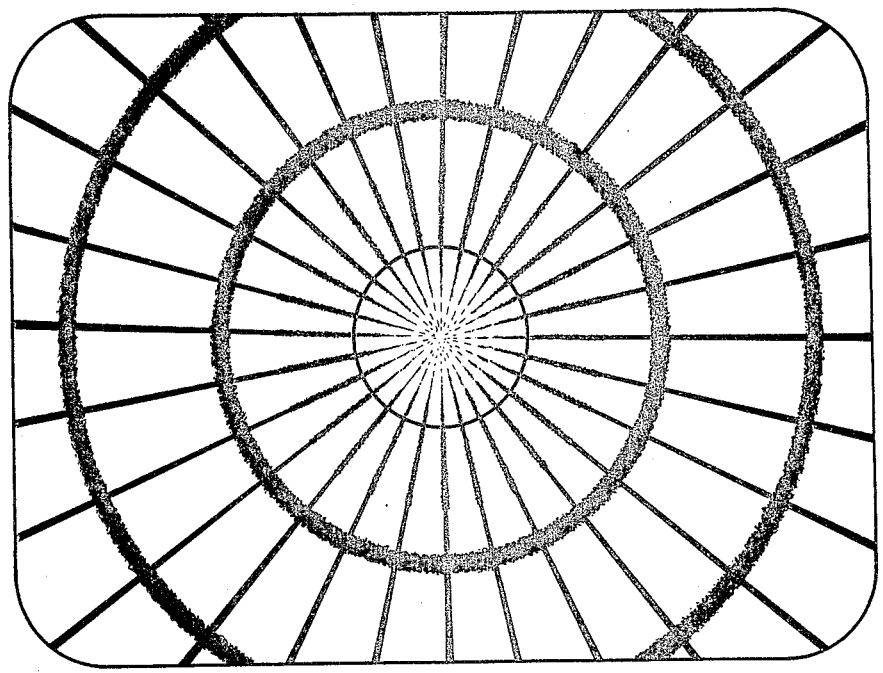

FIGURE 7 illustrates the view of the same cylindrical surface as that of FIGURE 5 as viewed by using a conical shaped mirror to reflect the light rays into a lens system. As is easily seen all of the vertical lines converge at the center of the mirror and a very severe distortion in which the horizontal lines are shortened with respect to the vertical lines is introduced. Furthermore, the varying radius of curvature of the conical mirror makes the center of the view out of focus when the periphery is in focus.

Figure 8:
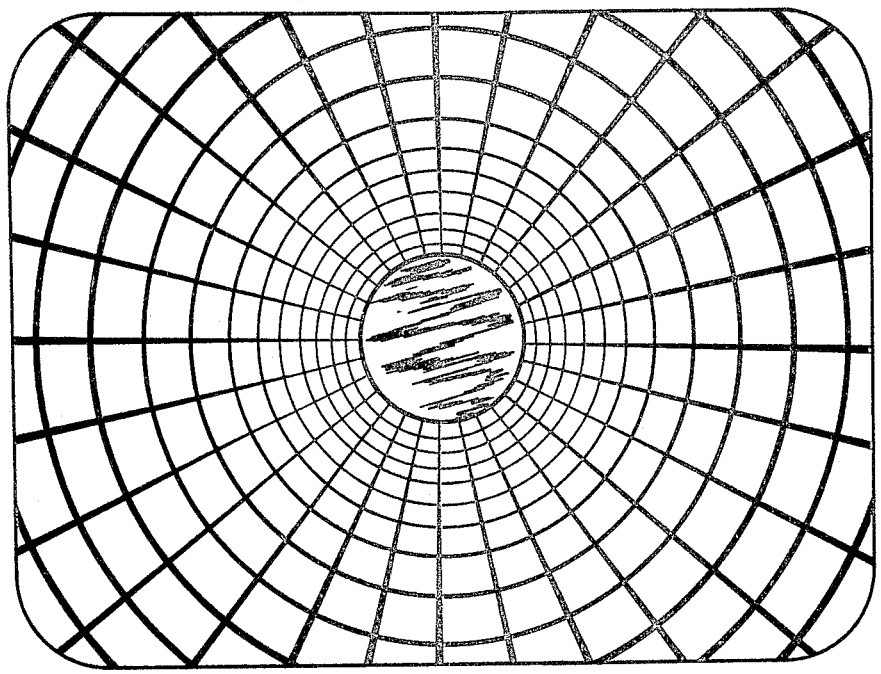

Finally, shown in FIGURE 8 is a view of the same cylinder as that of FIGURE 5 utilizing the combination of the spherical mirror and lens system shown and described above with relation to FIGURE 1. As is seen in FIGURE 8, the complete picture is in sharp focus. As has been previously stated, the optical viewing device views and is focused on the virtual image formed by the spherical mirror. For an object at infinity the virtual image formed by the spherical mirror will be at its focal point or a point one half of the radius of curvature behind the surface of the mirror. For an object at zero distance the virtual image formed by the spherical mirror will lie on the surface of the mirror. Thus it is seen that the depth of field necessary for paraxial rays is only that equal to one half of the radius or one fourth of the diameter of the spherical mirror. This, of course, is only if the field to be viewed is varied from zero to an infinite distance. In most cases as may be clearly seen in FIGURE 1, the light rays emanate from objects within a much narrower range of distance, thus decreasing further the depth of focus required of the lens system of the optical viewing device.

Furthermore a near equality of vertical and horizontal dimensions as shown in FIGURE 8, at any one location on the cylinder wall, is maintained. Due to this near equality, near equal resolution of features in two perpendicular directions at any point of the cylinder wall within the field of view is obtained. Although the spherical distortion introduced by the use of non-paraxial rays with the spherical mirror has distorted the true perspective of the cylinder slightly, this disadvantage is more than offset by the very valuable asset of obtaining very close to equal resolution for horizontal and vertical features. Furthermore the slight distortion of the perspective introduced by the spherical mirror is still acceptable to the human senses and may be readily interpreted by personnel with no prior training or experience.

From an inspection of FIGURES 5 to 8 it is clear that the spherical mirror provides a simple means for viewing the complete circumference of a borehole or a cylinder wall over a rather large area while providing very near equal resolution of horizontal and vertical features and maintaining the entire scene in sharp focus.

While but three embodiments of this invention have been described in detail, it is apparent that many modifications may be made by those skilled in the art. Likewise, the invention can be adapted to other optical viewing systems. Furthermore, the system may be used to inspect the interiors of well bores and the like to ascertain various geological phenomena, as for example the directions of fractures induced in the formation penetrated by the well bore or the direction and study of fluid flow within the well bore. The magnetic azimuth of well bore features may be ascertained by the embodiments in the invention shown in FIGURES 1, 3, and 4, where the use of a magnetic compass is shown. Furthermore, the use of a second viewing device as shown in FIGURE 2 may be made to produce high quality photographs or films of the cylinder or borehole walls as required. In addition to the above-described advantages of this invention, it also provides a means for the rapid scanning of the entirety of a borehole of appreciable extent. Also the invention provides for the inspection of the bottom of a borehole or an obstruction therein by the embodiment of FIGURE 1. Furthermore, as explained with reference to FIGURE 1, other optical systems, such as for instance a rotating mirror inclined at an angle of 45° to afford a detailed inspection of a small area of the bore hole wall, or various indicating devices may be disposed below the hole in the spherical mirror to afford a great versatility to this invention. Furthermore, the positioning of the angular orientation of a spherical mirror with suitable etched markings on its surface as shown in FIGURES 3 and 4 may be used to superimpose measurements of interest onto the view of a cylinder or borehole wall.

I claim as my invention:
1. An apparatus for inspecting the wall of a borehole and determining the inclination and azimuth of the borehole, said apparatus comprising:
   an optical viewing device disposed in a housing, said viewing device having a lens system with the axis of said lens system being parallel to the axis of the borehole;
   an illuminating means disposed in said housing adjacent said viewing device, said housing having a transparent section adjacent the viewing means and said illuminating means being disposed to illuminate the borehole adjacent said transparent section;
   a spherical mirror, said spherical mirror being rotatably mounted in said housing for rotation relative to said housing in both the horizontal and vertical planes, said mirror in addition being disposed on the axis of and spaced from said viewing device, said mirror in addition being provided with identifying marks on its surface for indicating the alignment of the mirror in both the horizontal and vertical planes;

a magnetic means operably associated with said mirror to align said mirror with the magnetic field of the earth; and a means disposed in said housing for forming reticule on the surface of the mirror, said reticule being aligned with the axis of said viewing means.

2. The apparatus of claim 1 wherein the spherical mirror is provided with a cone shaped interior surface, the apex of the conical surface being supported by a single pivot, and a ring of material having a higher density than the material forming the spherical mirror is attached to the spherical mirror adjacent the outer edge of the conical surface.

References Cited by the Examiner

UNITED STATES PATENTS

| | | | |
|---|---|---|---|
| 1,910,720 | 5/1933 | Tarlton | 95—11 |
| 2,012,455 | 8/1935 | Bazzoni | 33—205.5 |
| 2,244,235 | 6/1941 | Ayres | 95—15 X |
| 2,632,801 | 3/1953 | Donaldson | 95—11 |
| 2,633,645 | 4/1953 | Young | 33—205.5 |
| 2,737,864 | 3/1956 | Gutterman et al. | 95—11 |
| 2,971,259 | 2/1961 | Hahnau et al. | 33—1 |
| 2,996,807 | 8/1961 | Fletcher et al. | 33—205.5 |

LEONARD FORMAN, *Primary Examiner.*

WILLIAM D. MARTIN, *Assistant Examiner.*